(12) United States Patent
Attard et al.

(10) Patent No.: US 11,949,675 B2
(45) Date of Patent: Apr. 2, 2024

(54) DIRECT ACCESS TO EMBEDDED LINK VIA AUTHENTICATED APPLICATION

(71) Applicant: Salesforce, Inc., San Francisco, CA (US)

(72) Inventors: Samuel Attard, Vancouver (CA); Albert Xing, Vancouver (CA); Alfred Xing, Vancouver (CA)

(73) Assignee: Salesforce, Inc., San Francisco, CA (US)

( * ) Notice: Subject to any disclaimer, the term of this patent is extended or adjusted under 35 U.S.C. 154(b) by 4 days.

(21) Appl. No.: 17/147,113

(22) Filed: Jan. 12, 2021

(65) Prior Publication Data
US 2022/0224687 A1 Jul. 14, 2022

(51) Int. Cl.
*H04L 9/40* (2022.01)
*H04L 51/08* (2022.01)
*H04L 51/18* (2022.01)

(52) U.S. Cl.
CPC .......... *H04L 63/0884* (2013.01); *H04L 51/08* (2013.01); *H04L 51/18* (2013.01); *H04L 63/0876* (2013.01)

(58) Field of Classification Search
CPC ..... H04L 63/0884; H04L 51/08; H04L 51/18; H04L 63/0876
See application file for complete search history.

(56) References Cited

U.S. PATENT DOCUMENTS

| 10,348,655 B1 * | 7/2019 | Suhail | H04L 65/1063 |
| 2005/0278655 A1 * | 12/2005 | Sims | G06F 3/0481 |
| | | | 715/779 |
| 2017/0308867 A1 * | 10/2017 | Knoll | G06Q 10/1095 |
| 2018/0287982 A1 | 10/2018 | Draeger et al. | |
| 2019/0058680 A1 * | 2/2019 | Rosania | H04L 51/216 |
| 2020/0348828 A1 * | 11/2020 | Fay | G06F 3/04847 |

OTHER PUBLICATIONS

David Auerbach, "Re-Animator. How Stewart Butterfield created Flickr and Slack out of the ashes of failed projects" online retrieved May 9, 2019. Retrieved from the Internet: <URL: https://slate.com/business/2014/05/stewart-butterfield-flickr-and-slack-how-he-snatched-victory-from-the-jaws-of-defeat.html> 12 pages. (dated May 28, 2014, 2:48 PM) 8 pages.

(Continued)

*Primary Examiner* — Joe Chacko
(74) *Attorney, Agent, or Firm* — Lee & Hayes, P.C.

(57) ABSTRACT

Direct access to embedded links via an authenticated application is described. In an example, a first user interface can be presented via a web browser of a computing device, wherein the first user interface includes an actuation mechanism corresponding to an object associated with a platform, and wherein the computing device is associated with an application associated with the platform. In at least one example, an indication of an interaction with the actuation mechanism can be received and based at least in part on (i) receiving the indication of the interaction with the actuation mechanism and (ii) a determination that the application is associated with an active authentication session, the object can be presented via a second user interface presented via the application. As such, direct access to the object can be provided via the authenticated application.

20 Claims, 5 Drawing Sheets

(56) References Cited

OTHER PUBLICATIONS

Michael Carney, "Slack is thriving on a cocktail of whimsy and great timing", Pandodaily, Lexisnexis, https://advance.lexis.com/api/permalink/dd2d4ee5-2ddf-4d3a-a1d9-3bcee5e38b74/?context=1000516, (dated Feb. 6, 2015, 2:12 AM) 4 pages.
"Die, Email, Die! a Flickr Cofounder Aims to Cut Us All Some Slack", Readwriteweb, Lexisnexis, https://advance.lexis.com/api/permalink/33dd79e2-90f5-409d-ae27-5a2c7e86bf31/?context=1000516>. (dated Aug. 14, 2013, 4:15 PM) 3 pages.
Robert Hof, "Stewart Butterfield on How Slack Became a $2.8 Billion Unicorn", Forbes, [online] [retrieved May 9, 2019]. Retrieved from the Internet: <URL: https://www.forbes.com/sites/roberthof/2015/06/02/stewart-butterfield-on-how-slack-became-a-2-8-billion-unicorn-2/#7c31937d7d9c>. (dated Jun. 2, 2015, 3;25 PM), 4 pages.
"How Slack changed the way we work by putting the customer experience first", Repeat Customer Podcast, Episode 3, [online][retrieved May 9, 2019]. Retrieved from the Internet: <URL: https://www.zendesk.com/resources/slack-customer-experience/, (2019) 16 pages.
Matthew Ingram, "Flickr co-founder launches Slack, an all-in-one messaging tool designed to kill email forever", Gigaom, Lexisnexis, https://advance.lexis.com/api/permalink/0b676b7c-aec3-4560-861e-d030d1dd008c/?context=1000516, (dated Feb. 12, 2014, 7:03 PM), 3 pages.
Internet Relay Chat, Wikipedia, [online][retrieved May 30, 2019]. Retrieved from the Internet: <URL: https://en.wikipedia.org/wiki/Internet_Relay_Chat> (dated May 28, 2019) 21 pages.
Mike Issac, "Slack, a Start-Up With an App to Foster Business Collaboration, Is Valued at $1.1 Billion", The New York Times Blogs (BITS), Lexisnexis, https://advance.lexis.com/api/permalink/3eb84b34-a8f9-4d7d-9573-89d9598a4963/?context=1000516>. (dated Oct. 31, 2014) 3 pages.
Adrienne LaFrance, "The Triumph of Email", Atlantic Online, Lexisnexis, https://advance.lexis.com/api/permalink/32d7ddd9-d4c1-4a73-86f7-08ab5842fde6/?context=1000516, (dated Jan. 6, 2016) 6 pages.
Matsumoto, T. et al., "Chocoa Communicator—A New Communication System Based on Awareness and Text Communications", FUJITSU Sci. Tech. J., 36, 2, (Dec. 2000) pp. 154-161.
Oikarinen, J. & Reed, D., "Internet Relay Chat Protocol", Request for Comments: 1459, Network Working Group, [online][retrieved May 30, 2019]. Retrieved from the Internet: <URL: https://www.rfc-editor.org/rfc/rfc1459.txt>. (dated May 1993) 57 pages.
Ernie Smith, "Picking Up the Slack", Tedium, [online][retrieved May 9, 2019]. Retrieved from the Internet: <URL: https://tedium.co/2017/10/17/irc-vs-slack-chat-history/> (dated Oct. 17, 2017) 8 pages.
The Big Pivot w/ Slack's Stewart Butterfield, Masters of Scale Podcast, Episode 13 (Aired Nov. 14, 2017), https://mastersofscale.com/#/stewart-butterfield-the-big-pivot/, (dated Jan. 17, 2018) 21 pages.
Jonathan Vanian, "Why these startups think chat apps are the next big thing in workplace collaboration", Gigaom, Lexisnexis, https://advance.lexis.com/api/permalink/e83778c8-09c8-43aa-9ba0-88526283de69/?context=1000516, (dated Aug. 1, 2014, 5:45 PM) 4 pages.
Rebecca Walberg, "Email biggest office waste of time: survey", National Post, at FP10, Lexisnexis, https://advance.lexis.com/api/permalink/96268e3f-26ad-48ac-a98f-6c39804ebded/?context=1000516, (dated Mar. 4, 2014) 3 pages.

* cited by examiner

DIRECT ACCESS TO EMBEDDED LINK VIA AUTHENTICATED APPLICATION

TECHNICAL FIELD

A hyperlink, or "link," is an element (e.g., text, image, etc.) presented via a web page that is associated with a uniform resource identifier (URI) so that when clicked, or otherwise actuated, a web browser automatically displays content from another web page or changes the current web page to show content referenced by the hyperlink. Hyperlinks can be security risks as malicious actors can direct hyperlinks to malicious websites. Further, hyperlinks can be cumbersome as users are often required to login to websites to access content associated with hyperlinks.

BRIEF DESCRIPTION OF THE DRAWINGS

The detailed description is described with reference to the accompanying figures. In the figures, the left-most digit of a reference number identifies the figure in which the reference number first appears. The use of the same reference numbers in different figures indicates similar or identical components or features. The figures are not drawn to scale.

DETAILED DESCRIPTION

Figure 1:
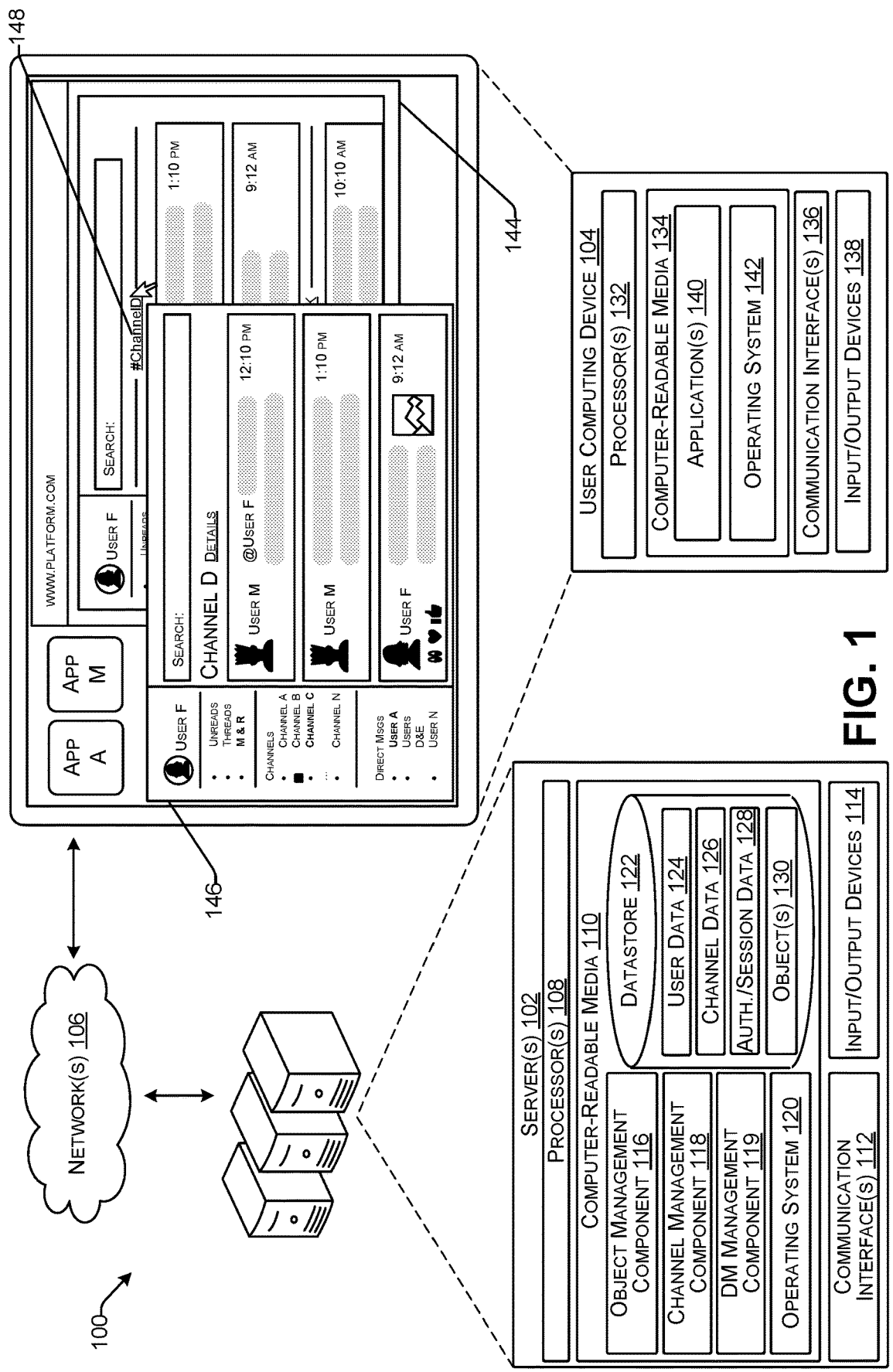
FIG. 1 illustrates an example environment for performing techniques described herein.

Direct access to embedded hyperlinks ("links") via authenticated applications is described. Due to security concerns, embedded links, or other actuation mechanisms, can often trigger an extensive authorization process to enable access to objects associated with such embedded links. Such an authorization process can cause one or more requests for data to be provided by a user (e.g., via a user interface and/or user interfaces) to authenticate and/or authorize a user for access to objects associated with such embedded links. Such an authorization process can be disruptive to the user experience and require computing resources for generating requests, receiving data, processing such data, and/or the like. Techniques described herein are directed to utilizing authenticated applications to verify authorization without the need for a separate authorization process. For example, a platform, such as a communication platform, can provide direct access to an object associated with an embedded link presented via a first application, such as a web browser, via authentication of a second application, such as a dedicated application. That is, the platform can be used as a trusted proxy to enable direct access from the first application to the second application, so long as both the first application and the second application are associated with authenticated sessions.

In an example, a first user interface can be presented via a first application, such as a web browser, of a computing device. The first user interface can include an actuation mechanism, such as a link, corresponding to an object associated with a platform, such as the communication platform. The computing device can be associated with a second application associated with the platform. In at least one example, an indication of an interaction with the actuation mechanism can be received and based at least in part on (i) receiving the indication of the interaction with the actuation mechanism and (ii) determining that the second application is associated with an active authentication session, the object can be presented via a second user interface presented via the second application. As such, direct access to the object can be provided via the second application, so long as both the first application and the second application are associated with authenticated sessions.

The communication platform, which in some examples can be a group-based communication platform, a channel-based communication platform, a permission-based communication platform, a channel-based messaging platform, and/or any other platform for facilitating communication between and among users, can be accessible via one or more access points. In some examples, the communication platform can be accessed via a web browser of a computing device of a user. In some examples, the communication platform can be accessed via another application, such as a dedicated application associated with the communication platform, of the computing device of the user. In at least one example, the web browser can present a user interface associated with the communication platform. In some examples, the user interface can include one or more references to one or more objects that are stored and/or managed by the communication platform. For the purpose of this discussion, an object can be text, an image, a video, a snippet of content, a user profile, a message, a file, a communication channel, a direct message, a board, a virtual space, an invitation, a sign-in request, and/or any other data item. In at least one example, a reference can be associated with an actuation mechanism, such as a link. Based at least in part on determining that the link has been actuated, computing device(s) associated with the communication platform can receive an indication that the link has been actuated. In some examples, the indication can include a unique identifier associated with the computing device of the user. In some examples, the unique identifier can be a device identifier, a desktop identifier, an application identifier, a session identifier, and/or the like.

In at least one example, a component associated with the computing device(s) associated with the communication platform can receive the indication and, based at least in part on the unique identifier, can determine whether there is a dedicated application on the computing device of the user that is associated with an active authentication session. In at least one example, if a dedicated application is associated with the computing device of the user and is authenticated, the component can send an instruction to the dedicated application to present the object via a user interface associated therewith. That is, the component can provide direct access to the object via the authenticated dedicated application.

Techniques described herein provide an improvement over existing techniques. As described above, due to security concerns, embedded links, or other actuation mechanisms, can often trigger an extensive authorization process to enable access to objects associated with such embedded links. Such an authorization process can cause one or more requests for data to be provided by a user (e.g., via a user interface and/or user interfaces) to authenticate and/or authorize a user for access to objects associated with such embedded links. Such an authorization process can be disruptive to the user experience and can require computing resources for generating requests, receiving data, processing such data, and/or the like. Techniques described herein are directed to utilizing authenticated applications to verify authorization without the need for a separate authorization process, thereby requiring fewer interactions between users and computing devices and computing resources for accessing objects associated with such embedded links. As such, techniques described herein provide an improvement to existing systems by offering improved user interfaces and/or experiences. That is, by enabling direct access to objects via authenticated applications, techniques described herein streamline user interaction with user interfaces (e.g., "zero click" from web browser to application). Furthermore, by reducing the number of windows or similar components required to access such objects, techniques described herein reduce processing and/or computing resources and streamline the user interface, thereby offering improvements to existing techniques.

FIG. 1 illustrates an example environment 100 for performing techniques described herein. In at least one example, the example environment 100 can include one or more server computing devices (or "server(s)") 102. In at least one example, the server(s) 102 can include one or more computing devices that can be embodied in any number of ways. For example, in the case of a server, the functional components and data can be implemented on a single server, a cluster of servers, a server farm or data center, a cloud-hosted computing service, a cloud-hosted storage service, and so forth, although other computer architectures can additionally or alternatively be used.

In at least one example, the server(s) 102 can be associated with a communication platform that can leverage a network-based computing system to enable users of the communication platform to exchange data. In at least one example, the communication platform can be "group-based" such that the platform, and associated systems, communication channels, messages, and/or virtual spaces, have security (that can be defined by permissions) to limit access to defined groups of users. In some examples, such groups of users can be defined by identifiers (e.g., group identifiers), which can be associated with common access credentials, domains, or the like. In some examples, the communication platform can be a hub, offering a secure and private virtual space to enable users to chat, meet, call, collaborate, transfer files or other data, message, or otherwise communicate between or among each other.

In some examples, each group can be associated with an organization, which can be associated with an organization identifier. Users associated with the organization identifier can chat, meet, call, collaborate, transfer files or other data, message, or otherwise communicate between or among each other in a secure and private virtual space available via the communication platform. In some examples, each group can be associated with a workspace, associated with a workspace identifier. Users associated with the workspace identifier can chat, meet, call, collaborate, transfer files or other data, message, or otherwise communicate between or among each other in a secure and private virtual space available via the communication platform. In some examples, a group can be associated with multiple organizations and/or workspaces. In some examples, an organization can be associated with multiple workspaces.

In at least one example, the server(s) 102 can communicate with a user computing device 104 (or a "client computing device") via one or more network(s) 106. That is, the server(s) 102 and the user computing device 104 can transmit, receive, and/or store data (e.g., content, information, or the like) using the network(s) 106, as described herein. The user computing device 104 can be any suitable type of computing device, e.g., portable, semi-portable, semi-stationary, or stationary. Some examples of the user computing device 104 can include a tablet computing device, a smart phone, a mobile communication device, a laptop, a netbook, a desktop computing device, a terminal computing device, a wearable computing device, an augmented reality device, an Internet of Things (IOT) device, or any other computing device capable of sending communications and performing the functions according to the techniques described herein. While a single user computing device 104 is shown, in practice, the example environment 100 can include multiple (e.g., tens of, hundreds of, thousands of, millions of) user computing devices. In at least one example, user computing devices, such as the user computing device 104, can be operable by users to, among other things, access communication services via the communication platform. A user can be an individual, a group of individuals, an employer, an enterprise, an organization, or the like. In some examples, users can be associated with designated roles (e.g., administrator, team leader, etc.) and/or types (e.g., verified, etc.).

The network(s) 106 can include, but are not limited to, any type of network known in the art, such as a local area network or a wide area network, the Internet, a wireless network, a cellular network, a local wireless network, Wi-Fi and/or close-range wireless communications, Bluetooth®, Bluetooth Low Energy (BLE), Near Field Communication (NFC), a wired network, or any other such network, or any combination thereof. Components used for such communications can depend at least in part upon the type of network, the environment selected, or both. Protocols for communicating over such network(s) 106 are well known and are not discussed herein in detail.

In at least one example, the server(s) 102 can include one or more processors 108, computer-readable media 110, one or more communication interfaces 112, and input/output devices 114.

In at least one example, each processor of the processor(s) 108 can be a single processing unit or multiple processing units, and can include single or multiple computing units or multiple processing cores. The processor(s) 108 can be implemented as one or more microprocessors, microcomputers, microcontrollers, digital signal processors, central processing units (CPUs), graphics processing units (GPUs), state machines, logic circuitries, and/or any devices that manipulate signals based on operational instructions. For example, the processor(s) 108 can be one or more hardware processors and/or logic circuits of any suitable type specifically programmed or configured to execute the algorithms and processes described herein. The processor(s) 108 can be configured to fetch and execute computer-readable instructions stored in the computer-readable media, which can program the processor(s) to perform the functions described herein.

The computer-readable media 110 can include volatile, nonvolatile, removable, and/or non-removable memory or other media implemented in any type of technology for storage of data, such as computer-readable instructions, data structures, program modules, or other data. Such computer-readable media 110 can include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired data and that can be accessed by a computing device. Depending on the configuration of the server(s) 102, the computer-readable media 110 can be a type of computer-readable storage media and/or can be a tangible non-transitory media to the extent that when mentioned, non-transitory computer-readable media exclude media such as energy, carrier signals, electromagnetic waves, and signals per se.

The computer-readable media 110 can be used to store any number of functional components that are executable by the processor(s) 108. In many implementations, these functional components comprise instructions or programs that are executable by the processor(s) 108 and that, when executed, specifically configure the processor(s) 108 to perform the actions attributed above to the server(s) 102. Functional components stored in the computer-readable media can optionally include an object management component 116, a channel management component 118, a direct message management component 119, an operating system 120, and a datastore 122.

In at least one example, the object management component 116 can manage one or more objects associated with the communication platform. As described above, a user interface associated with the communication platform can be presented via the user computing device 104. In some examples, the user interface can be presented via a first application, such as a web browser. In some examples, the user interface can include one or more references to one or more objects that are stored and/or managed by the object management component 116. As described above, an object can be text, an image, a video, a snippet of content, a user profile, a message, a file, a communication channel, a direct message, a board, a virtual space, an invitation, a sign-in request, and/or any other data item. In at least one example, a reference can be associated with an actuation mechanism, such as a link. In some examples, the object management component 116 can generate and/or otherwise associate actuation mechanisms with objects.

In at least one example, based at least in part on receiving an indication that an actuation mechanism has been actuated (e.g., an indication of an interaction with the actuation mechanism), the object management component 116 can receive an indication of such. In some examples, the indication can include an object identifier associated with the object, a unique identifier associated with the user computing device 104, a timestamp associated with the actuation, and/or the like. In at least one example, the unique identifier can be a device identifier, a desktop identifier, an application identifier, a session identifier, and/or the like. In some examples, the first application (e.g., the web browser) can receive the unique identifier from a second application (e.g., a dedicated application) during a sign-in process. That is, a user can sign-in to the communication platform via the second application, which can use the first application to effectuate the sign-in process. During the sign-in process, the first application can receive the unique identifier and can store the unique identifier for future use. In at least one example, the first application can associate the unique identifier with indications of actuations, as described above.

The object management component 116 can determine, based at least in part on the unique identifier, whether there is an application on the user computing device 104 that is associated with the communication platform (e.g., a dedicated application). Further, the object management component 116 can determine whether such an application is associated with an active authentication session. That is, the object management component 116 can determine whether (i) the user computing device 104 is associated with a second application associated with the communication platform and (ii) the second application is authenticated.

In at least one example, if the user computing device 104 is associated with an authenticated second application, the object management component 116 can send an instruction to the user computing device 104 (e.g., to the second application) to present the object via a user interface associated therewith. In some examples, the instruction can be associated with the unique identifier and an object identifier. In some examples, the instruction can be associated with a real-time message (e.g., a message send within a threshold amount of time (e.g., 5-20 milliseconds, etc.) of when the indication is received and/or via a websocket-based application programming interface (API) provided by and/or associated with the communication platform). In some examples, the instruction can be associated with a push notification or other notification that can be received by the user computing device 104. In some examples, the instruction can be sent in response to a query (e.g., a "pull") from the second application to determine whether another application is trying to load the second application. In some examples, the instruction can cause the second application to transition from a closed state to an open state. In some examples, the instruction can cause the second application to transition from a first workspace to a second workspace. Additional details are provided below.

In some examples, a user can be signed-in to multiple instances of the second application (e.g., on multiple user computing devices). Each user computing device associated with an instance of the second application into which the user is signed-in can be associated with a unique identifier. In some examples, the object management component 116 can send instructions to each of the instances of the second application associated with an active authentication session. In at least one example, each of the instructions can be associated with the unique identifier associated with the indication of the actuation (e.g., associated with the user computing device 104). In such examples, each instance of the second application can compare respective unique identifiers with the unique identifier associated with a received instruction. If unique identifiers match, or otherwise correspond, the associated user computing device and instance of the second application can present the object. For illustrative purposes, in FIG. 1, the user computing device 104 and associated instance of the second application can be associated with a unique identifier that matches, or otherwise corresponds, with the unique identifier received in the instruction (and provided by the first application).

In at least one example, based at least in part on determining that (i) the user computing device 104 is associated with a second application associated with the communication platform and (ii) the second application is authenticated, the object management component 116 can send an indication that the second application is presenting or is to present the object to the first application. That is, the object management component 116 can notify the first application that the presentation of the object is being handled (e.g., by the second application). In some examples, such an indication can be sent to the first application responsive to receiving an indication from a particular user computing device and/or instance of the second application (e.g., the user computing device 104 and/or the instance of the second application associated therewith) that it is presenting or is to present the object. In some examples, based at least in part on receiving such an indication from the object management component 116, the first application can close a web page that was previously presenting the user interface and/or the like.

In at least one example, the channel management component 118 can manage communication channels (i.e., "channels") of the communication platform. In at least one example, the communication platform can be "channel-based" such that the platform can be organized into communication channels having security (that can be defined by permissions) to limit access to defined groups of users (e.g., members of the communication channels). A communication channel, or virtual space, can be a data route used for exchanging data between and among systems and devices associated with the communication platform. In some examples, a communication channel may be "public," which may allow any user within a group (e.g., associated with an organization identifier, associated with a workspace identifier, etc.) with which the communication channel is associated to join and participate in the data sharing through the communication channel. In some examples, a communication channel may be "private," which may restrict data communications in the communication channel to certain users or users having particular roles (e.g., managers, administrators, etc.) and/or types (e.g., verified, etc.).

In some examples, a communication channel may be "shared," which may allow users associated with two or more different groups (e.g., entities associated with two or more different organization and/or workspace identifiers) to join and participate in the data sharing through the communication channel. A shared communication channel may be public such that it is accessible to any user of groups associated with the shared communication channel, or may be private such that it is restricted to access by certain users or users having particular roles and/or types. A "shared communication channel" or an "externally shared communication channel" can enable two or more organizations, such as a first organization and a second organization to share data, exchange communications, and the like. In an example, the first organization and the second organization can be associated with different organization identifiers, can be associated with different business entities, have different tax identification numbers, and/or otherwise can be associated with different permissions such that users associated with the first organization and users associated with the second organization are not able to access data associated with the other organization, without the establishment of an externally shared channel. In some examples, a shared communication channel can be shared with one or more different workspaces and/or organizations that, without having a shared communication, would not otherwise have access to each other's data by the nature of the permission-based and/or group-based configuration of the communication platform described herein.

In at least one example, the channel management component 118 can receive a request to generate a communication channel. In some examples, the request can include a name that is to be associated with the communication channel, one or more users to invite to join the communication channel, and/or permissions associated with the communication channel. In at least one example, one or more user identifiers associated with one or more users and/or one or more user accounts can be mapped to, or otherwise associated with, a communication channel (e.g., a communication channel identifier associated therewith). User(s) associated with a communication channel can be "members" of the communication channel. Members of a communication channel can communicate with other members via the communication channel. That is, in at least one example, the channel management component 118 can establish a communication channel between and among various user computing devices associated with user identifiers associated with the communication channel, allowing the user computing devices to communicate and share data between and among each other. As described herein, in some examples, such communication and/or sharing of data can be via one or more messages that can be exchanged via a communication channel. In at least one example, the channel management component 118 can manage such communications and/or sharing of data. In some examples, data associated with a communication channel can be presented via a user interface.

As described above, in at least one example, one or more permissions can be mapped to, or otherwise associated with, a communication channel and/or members associated therewith. Such permission(s) can indicate which user(s) have permission to access the communication channel, actions and/or messages permitted in the communication channel, which user(s) and/or type(s) of users are permitted to add or remove members, which user(s) and/or types of users are permitted to share the communication channel with other users, a retention policy associated with data in the communication channel, whether the communication channel is public or private, or the like.

In at least one example, the direct message (DM) management component 119 can manage "direct messages," which can comprise communications with individual users or multiple specified users (e.g., instead of all, or a subset of, members of an organization). In at least one example, a "direct message" can comprise a data route, or virtual space, used for exchanging data between and among systems and devices associated with the communication platform. In some examples, a direct message can be a private message between two or more users of the communication platform. In some examples, a direct message may be "shared," which may allow users associated with two or more different groups (e.g., entities associated with two or more different organization and/or workspace identifiers) to join and participate in the data sharing through the direct message.

In at least one example, the direct message management component 119 can receive a request to generate a direct message. In some examples, the request can include identifiers associated with one or more users that are intended recipient(s) of the direct message. In at least one example, one or more user identifiers associated with one or more users and/or one or more user accounts can be mapped to, or otherwise associated with, a direct message (e.g., or direct message identifier associated therewith). User(s) associated with a direct message can communicate with one another and/or otherwise share data with one another via the direct message. As described herein, in some examples, such communication and/or sharing of data can be via one or more messages that can be exchanged via the direct message. In at least one example, the direct message management component 119 can manage such communications and/or sharing of data. In some examples, data associated with a direct message can be presented via a user interface.

In at least one example, the operating system 120 can manage the processor(s) 108, computer-readable media 110, hardware, software, etc. of the server(s) 102.

In at least one example, the datastore 122 can be configured to store data that is accessible, manageable, and updatable. In some examples, the datastore 122 can be integrated with the server(s) 102, as shown in FIG. 1. In other examples, the datastore 122 can be located remotely from the server(s) 102 and can be accessible to the server(s) 102 and/or user device(s), such as the user computing device 104. The datastore 122 can comprise one or multiple databases, which can include user data 124, channel data 126, authentication ("auth")/session data 128, and data regarding one or more objects 130. Additional or alternative data may be stored in the datastore and/or one or more other datastores (e.g., direct message data, permission data, etc.).

In at least one example, the user data 124 can store data associated with users of the communication platform. In at least one example, the user data 124 can store data in user profiles (which can also be referred to as "user accounts"), which can store data associated with a user, including, but not limited to, one or more user identifiers associated with multiple, different organizations, groups, or entities with which the user is associated, one or more communication channel identifiers associated with communication channels to which the user has been granted access, one or more group identifiers for groups (or, organizations, teams, entities, or the like) with which the user is associated, an indication whether the user is an owner or manager of any communication channels, an indication whether the user has any communication channel restrictions, a plurality of messages, a plurality of emojis, a plurality of conversations, a plurality of conversation topics, an avatar, an email address, a real name (e.g., John Doe), a username (e.g., j doe), a password, a time zone, a status, a token, and the like.

In at least one example, the user data 124 can be associated with permission data, which can indicate permissions of individual users of the communication platform. In some examples, permissions can be set automatically or by an administrator of the communication platform, an employer, enterprise, organization, or other entity that utilizes the communication platform, a team leader, a group leader, or other entity that utilizes the communication platform for communicating with team members, group members, or the like, an individual user, or the like. In some examples, permissions can indicate which users can communicate directly with other users, which channels a user is permitted to access, restrictions on individual channels, which workspaces the user is permitted to access, restrictions on individual workspaces, and the like. In at least one example, the permissions can support the communication platform by maintaining security for limiting access to a defined group of users. In some examples, such users can be defined by common access credentials, group identifiers, or the like, as described above.

In at least one example, the channel data 126 can store data associated with individual communication channels. In at least one example, the channel management component 118 can establish a communication channel between and among various user computing devices, allowing the user computing devices to communicate and share data between and among each other. In at least one example, a communication channel identifier may be assigned to a communication channel, which indicates the physical address in the channel data 126 where data related to that communication channel is stored.

In at least one example, the authentication/session data 128 can store data associated with authentication and/or sessions of individual users and groups, communication channels, boards, applications, and/or the like. In at least one example, the authentication/session data 128 can store indications of unique identifiers and associated user computing devices. In some examples, a unique identifier can be associated with a user computing device and an indication of whether an instance of an application associated therewith is authenticated (e.g., associated with an active authentication session). In such examples, a user can have provided authentication/session data 128 via an application (e.g., a web browser, dedicated application, and/or the like), which can be stored in association with the unique identifier, the application, and/or the user computing device 104. In some examples, authentication/session data 128 can be provided via a particular workspace. In at least one example, the authentication/session data 128 can be valid or active for a period of time, until an event occurs (e.g., a request to log out is received, fraud is suspected or detected, or the like), etc. In some examples, the authentication/session data 128 can include indications of sessions (e.g., period of time during which an application is active and/or authenticated), etc.

In at least one example, the data associated with the object(s) 130 can store individual object identifiers and/or other data associated with the object(s) 130.

In at least one example, the datastore 122 can store additional or alternative data. For example, the datastore 122 can store direct message (DM) data associated with individual direct messages. In at least one example, the direct message management component 119 can establish a direct message between and among various user computing devices, allowing the user computing devices to communicate and share data between and among each other via the direct message. In at least one example, a direct message identifier may be assigned to a direct message, which indicates the physical address in the DM data where data related to that direct message is stored.

In some examples, the datastore 122 can store permission data, which can indicate permissions of groups associated with the communication platform, individual communication channels associated with the communication platform, etc. In some examples, permissions can be set automatically or by an administrator of the communication platform, an employer, enterprise, organization, or other entity that utilizes the communication platform, a team leader, a group leader, or other entity that utilizes the communication platform for communicating with team members, group members, or the like, an individual user, or the like. In some examples, permissions associated with a group can be mapped to, or otherwise associated with, data associated with the group. In some examples, permissions can indicate restrictions on individual groups, restrictions on communication channel(s) associated with individual groups, restrictions on user(s) associated with individual groups, and the like. In at least one example, the permissions can support the communication platform by maintaining security for limiting access to a defined group of users. In some examples, such groups can be defined by common access credentials, group identifiers, or the like, as described above. In some examples, permissions associated with a communication channel can be mapped to, or otherwise associated with, data associated with the communication channel in the channel data 126. In some examples, permissions can indicate restrictions on individual communication channels, restrictions on user(s) associated with individual communication channels, and the like.

In some examples, the datastore 122 can be partitioned into discrete items of data that may be accessed and managed individually (e.g., data shards). Data shards can simplify many technical tasks, such as data retention, unfurling (e.g., detecting that message contents include a link, crawling the link's metadata, and determining a uniform summary of the metadata), and integration settings. In some examples, data shards can be associated with groups (e.g., organizations, workspaces), communication channels, direct messages, users, or the like.

In some examples, individual groups can be associated with a database shard within the datastore 122 that stores data related to a particular group identification. For example, a database shard may store electronic communication data associated with members of a particular group, which enables members of that particular group to communicate and exchange data with other members of the same group in real-time or near real-time. In this example, the group itself can be the owner of the database shard and has control over where and how the related data is stored. In some examples, a database shard can store data related to two or more groups (e.g., as in a shared channel).

In some examples, a communication channel can be associated with a database shard within the datastore 122 that stores data related to a particular channel identification. For example, a database shard may store electronic communication data associated with the communication channel, which enables members of that particular communication channel to communicate and exchange data with other members of the same communication channel in real-time or near real-time. In this example, a group or organization can be the owner of the database shard and can control where and how the related data is stored.

In some examples, a direct message can be associated with a database shard within the datastore 122 that stores data related to a particular direct message identification. For example, a database shard may store electronic communication data associated with the direct message, which enables a user associated with a particular direct message to communicate and exchange data with other users associated with the same direct message in real-time or near real-time. In this example, a group or organization can be the owner of the database shard and can control where and how the related data is stored.

In some examples, individual users can be associated with a database shard within the datastore 122 that stores data related to a particular user account. For example, a database shard may store electronic communication data associated with an individual user, which enables the user to communicate and exchange data with other users of the communication platform in real-time or near real-time. In some examples, the user itself can be the owner of the database shard and has control over where and how the related data is stored.

The communication interface(s) 112 can include one or more interfaces and hardware components for enabling communication with various other devices (e.g., the user computing device 104), such as over the network(s) 106 or directly. In some examples, the communication interface(s) 112 can facilitate communication via Websockets, APIs (e.g., using API calls), HypterText Transfer Protocols (HTTPs), etc.

The server(s) 102 can further be equipped with various input/output devices 114 (e.g., I/O devices). Such I/O devices 114 can include a display, various user interface controls (e.g., buttons, joystick, keyboard, mouse, touch screen, etc.), audio speakers, connection ports and so forth.

In at least one example, the user computing device 104 can include one or more processors 132, computer-readable media 134, one or more communication interfaces 136, and input/output devices 138. As described above, in some examples, the user computing device 104 can be referred to as a "client computing device."

In at least one example, each processor of the processor(s) 132 can be a single processing unit or multiple processing units, and can include single or multiple computing units or multiple processing cores. The processor(s) 132 can comprise any of the types of processors described above with reference to the processor(s) 108 and may be the same as or different than the processor(s) 108.

The computer-readable media 134 can comprise any of the types of computer-readable media 134 described above with reference to the computer-readable media 110 and may be the same as or different than the computer-readable media 110. Functional components stored in the computer-readable media can optionally include application(s) 140 and an operating system 142.

In at least one example, the application(s) 140 can be one or more of a mobile application, a web application, or a desktop application, which can be provided by the communication platform or which can be an otherwise dedicated application. In at least one example, an application of the application(s) 140 can be a native application associated with the communication platform. In some examples, individual user computing devices associated with the environment 100 can have an instance or versioned instance of such an application (e.g., the native application), which can be downloaded from an application store, accessible via the Internet, or otherwise executable by the processor(s) 132 to perform operations as described herein. That is, in at least one example, reference to an application on the user computing device 104 can be an instance of the application.

In at least one example, an application of the application(s) 140 can be an access point, enabling the user computing device 104 to interact with the server(s) 102 to access and/or use communication services available via the communication platform. In some examples, an application of the application(s) 140 can be a web browser by which a user can access communication services provided by the communication platform as described herein. In some examples, an application of the application(s) 140 can be a dedicated application associated with the communication platform as described herein. In at least one example, the application(s) 140 can facilitate the exchange of data between and among various other user computing devices, for example via the server(s) 102. In at least one example, the application(s) 140 can present user interface(s), as described herein. In at least one example, a user can interact with the user interface(s) via touch input, keyboard input, mouse input, spoken input, or any other type of input.

A non-limiting example of user interfaces 144 and 146 are shown in FIG. 1. In at least one example, the user interface 144 can be presented via a first application, such as a web browser. In at least one example, the user interface 146 can be presented via a second application, such as a dedicated application. In at least one example, the user interface 144 and the user interface 146 can each be associated with the communication platform.

In at least one example, the user interface 146 can be presented based at least in part on a detected interaction with the user interface 144. That is, in at least one example, the user interface 144 can be associated with representation(s) of object(s) associated with the communication platform (e.g., stored in the object(s) 130). Individual of the representation(s) can be associated with actuation mechanism(s). As an example, the text element "#ChannelID" can be a representation of an object (e.g., a communication channel) and can be associated with an actuation mechanism 148 (e.g., a link) that when actuated can cause the first application to send an indication of the actuation to the server(s)

102. In some examples, the indication can be associated with a unique identifier (e.g., associated with the user computing device 104), an object identifier associated with the object, a timestamp associated with the actuation, etc. As described above, in some examples, the unique identifier can have been previously provided to the first application in association with an authentication of a second application (e.g., a dedicated application) and stored by the first application.

In at least one example, the object (e.g., the communication channel and contents associated therewith) can be presented via a second application. That is, the second application can present the object via the user interface 146. As described herein, the object can be presented via the user interface 146 (e.g., by the second application) based at least in part on the object management component 116 receiving the indication of the actuation and determining (i) that the second application is associated with the user computing device 104 (e.g., based at least in part on the unique identifier) and (ii) the second application is associated with an active authentication session. That is, the object can be presented via the user interface 146 based at least in part on a determination that the user computing device 104 is associated with an authenticated application associated with the communication platform.

As described above, in some examples, the object management component 116 can send instructions to one or more user computing devices (e.g., each user computing device in which a user is currently signed-in to an instance of an application associated with the communication platform and/or associated with an instance of the application that is associated with an active authentication session). Such instructions can include the unique identifier and an instruction to present the object. In some examples, each instruction can include an object identifier of the object. If the second application determines that a unique identifier associated therewith matches, or otherwise corresponds to, the unique identifier associated with the instruction, the second application can present the object via the user interface 146. In at least one example, the user interface 146 can be presented without requiring additional input from the user.

In at least one example, the operating system 142 can manage the processor(s) 132, computer-readable media 134, hardware, software, etc. of the user computing device 104.

The communication interface(s) 136 can include one or more interfaces and hardware components for enabling communication with various other devices (e.g., the user computing device 104), such as over the network(s) 106 or directly. In some examples, the communication interface(s) 136 can facilitate communication via Websockets, APIs (e.g., using API calls), HTTPs, etc.

The user computing device 104 can further be equipped with various input/output devices 138 (e.g., I/O devices). Such I/O devices 138 can include a display, various user interface controls (e.g., buttons, joystick, keyboard, mouse, touch screen, etc.), audio speakers, connection ports and so forth.

While techniques described herein are described as being performed by the object management component 116, the channel management component 118, the direct message management component 119, and the application(s) 140, techniques described herein can be performed by any other component, or combination of components, which can be associated with the server(s) 102, the user computing device 104, or a combination thereof.

Figure 2A:
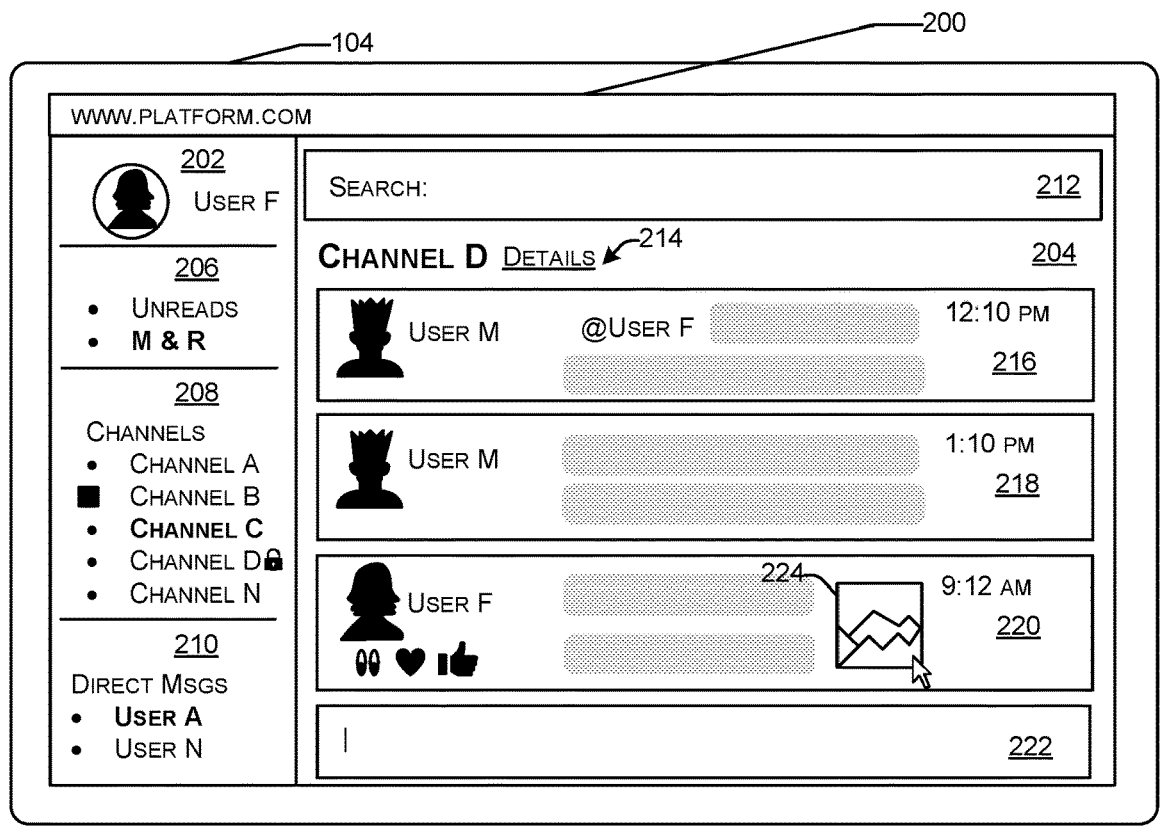
FIG. 2A illustrates an example user interface presented via a first application, as described herein.

FIG. 2A illustrates an example user interface 200 presented via a first application, such as a web browser, as described herein. The user interface 200 can correspond to the user interface 144 described above with reference to FIG. 1. In at least one example, the user interface 200 can be associated with the communication platform, described above. That is, in at least one example, the server(s) 102 can send instructions to the user computing device 104 for presenting the user interface 200 via the first application.

In at least one example, the user interface 200 can present data associated with one or more communication channels. In some examples, the user interface 200 can be a "channel-based" user interface. In some examples, the user interface 200 can include a first section 202 (e.g., which can be a portion, pane, or other partitioned unit of the user interface 200), that includes indicator(s) (e.g., user interface element(s) or object(s)) representing data associated with communication channel(s), direct message(s), etc. with which the user (e.g., account of the user) is associated. In at least one example, the user interface 200 can include a second section 204 (e.g., which can be a portion, pane, or other partitioned unit of the user interface 200) that, in some examples, can be associated with a data feed (or, "feed") indicating messages posted to and/or actions taken with respect to one or more communication channels and/or other virtual spaces for facilitating communications (e.g., a virtual space associated with direct message communication(s), a virtual space associated with event(s) and/or action(s), etc.) as described herein. In at least one example, data associated with the second section 204 can be associated with the same or different workspaces. That is, in some examples, the second section 204 can present data associated with the same or different workspaces via an integrated feed. In some examples, the data can be organized and/or is sortable by date, time (e.g., when associated data is posted or an associated operation is otherwise performed), type of action and/or data, workspace, communication channel, user, topic, relevance metric, and/or the like. In some examples, such data can be associated with an indication of which user (e.g., member of the communication channel) posted the message and/or performed an action. In examples where the second section 204 presents data associated with multiple workspaces, at least some data can be associated with an indication of which workspace the data is associated with.

In at least one example, the first section 202 can include one or more sub-sections, which can represent different virtual spaces. For example, a first sub-section 206 can include indicators representing virtual spaces that can aggregate data associated with a plurality of communication channels and/or workspaces. In at least one example, each virtual space can be associated with an indicator in the first sub-section 206. In some examples, an indicator can be associated with an actuation mechanism, that when actuated, can cause data associated with the corresponding virtual space to be presented via a second section 204 of the user interface 200. In some examples, instead of presenting the data associated with the corresponding virtual space via the second section 204, such data can be presented via another user interface presented via another application, as described herein.

In at least one example, a virtual space can be associated with all unread data associated with each of the workspaces with which the user is associated. That is, in some examples, if the user requests to access the virtual space associated with "unreads," all data that has not been read (e.g., viewed) by the user can be presented in the second section 204, for example in a feed. In another example, "threads" can be associated with messages, files, etc. posted in threads to messages posted in a communication channel and/or a virtual space associated with "mentions and reactions" (e.g., "M & R") can be associated with messages or threads where the user (e.g., User F) has been mentioned (e.g., via a tag) or another user has reacted (e.g., via an emoji, reaction, or the like) to a message or thread posted by the user. In some examples, if the user requests to access the virtual space associated with "snippets of content," snippets of content associated with the user, which can be associated with different communication channels and/or virtual spaces, can be presented via a same feed. In some examples, such data can be organized and/or is sortable by date, time (e.g., when associated data is posted or an associated operation is otherwise performed), type of action and/or data, workspace, communication channel, user, topic, relevance metric, and/or the like. In some examples, such data can be associated with an indication of which user (e.g., member of the communication channel) posted the message, performed an action, and/or the like. Additional details are described below.

In at least one example, the first section 202 of the user interface 200 can include a second sub-section 208 that includes indicators representing communication channels. In some examples, the communication channels can include public channels, private channels, shared channels (e.g., between workspaces or organizations), single workspace channels, cross-workspace channels, combinations of the foregoing, or the like. In some examples, the communication channels represented can be associated with a single workspace. In some examples, the communication channels represented can be associated with different workspaces (e.g., cross-workspace). In some examples, the communication channels represented can be associated with combinations of communication channels associated with a single workspace and communication channels associated with different workspaces.

In some examples, the second sub-section 208 can depict all communication channels, or a subset of all communication channels, that the user has permission to access (e.g., as determined by the channel data 126). In such examples, the communication channels can be arranged alphabetically, based on most recent interaction, based on frequency of interactions, based on communication channel type (e.g., public, private, shared, cross-workspace, etc.), based on workspace, in user-designated sections, or the like. In some examples, the second sub-section 208 can depict all communication channels, or a subset of all communication channels, that the user is a member of, and the user can interact with the user interface 200 to browse or view other communication channels that the user is not a member of but are not currently displayed in the second sub-section 208. In some examples, different types of communication channels (e.g., public, private, shared, etc.) can be in different sections of the second sub-section 208, or can have their own sub-sections or sub-sections in the user interface 200. In some examples, communication channels associated with different workspaces can be in different portions of the second sub-section 208, or can have their own sections or sub-sections in the user interface 200.

Figure 3A:
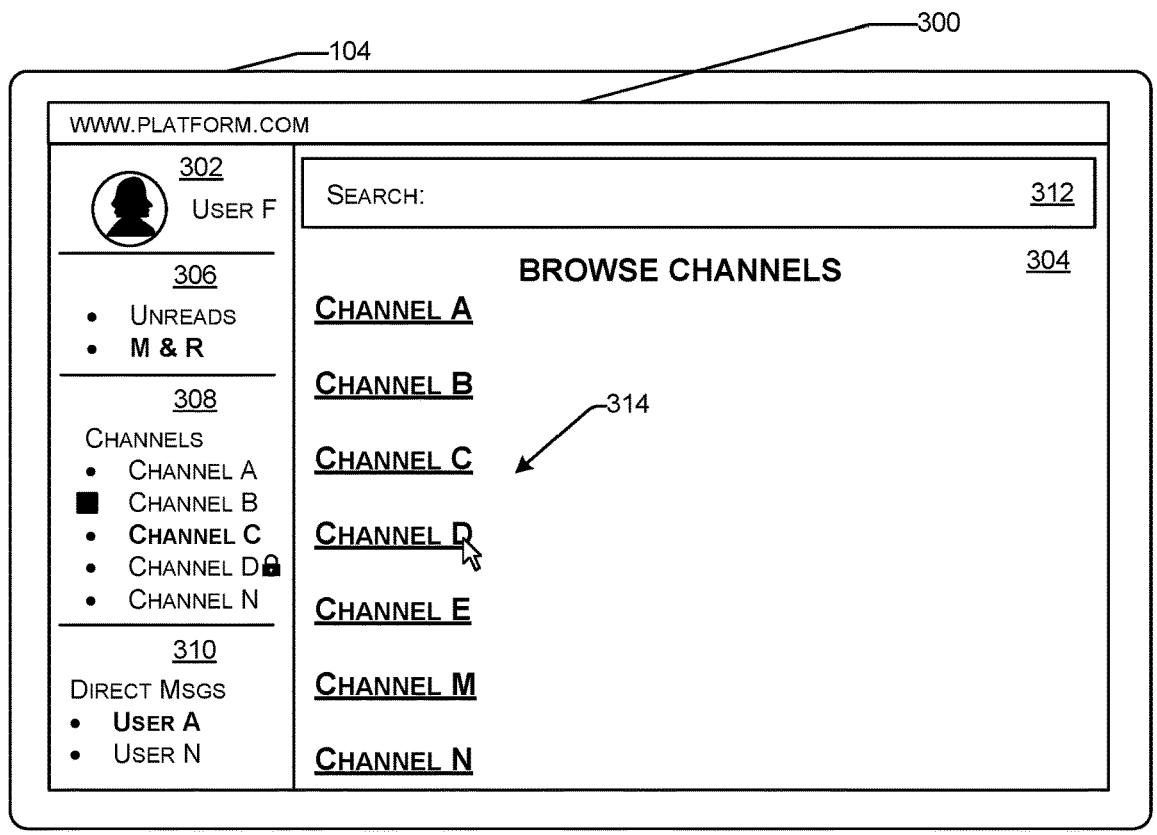
FIG. 3A illustrates an example user interface presented via a first application, as described herein.

In some examples, the indicators can be associated with user interface elements that visually differentiate types of communication channels. For example, Channel B is associated with a square user interface element instead of a circle user interface element. As a non-limiting example, and for the purpose of this discussion, the square user interface element can indicate that the associated communication channel (e.g., Channel B) is an externally shared communication channel. In some examples, such a user interface element can be the same for all externally shared communication channels. In other examples, such a user interface element can be specific to the other group with which the externally shared communication channel is associated. In some examples, additional or alternative graphical elements can be used to differentiate between public communication channels, private communication channels, shared communication channels, communication channels associated with different workspaces, and the like. In other examples, communication channels that the user is not a current member of may not be displayed in the second sub-section 208 of the user interface 200. In such examples, the user may navigate to a different interface (an example of which is illustrated in FIG. 3A) to browse additional channels that are accessible to the user but to which the user is not currently a member.

In addition to the second sub-section 208, the first section 202 can include a third sub-section 210 that can include indicators representative of direct messages. That is, the third sub-section 210 can include indicators representative of virtual spaces that are associated with private messages between one or more users, as described above.

As described above, in at least one example, the user interface 200 can include a second section 204 that, in some examples, can be associated with a feed indicating messages posted to and/or actions taken with respect to a communication channel and/or other virtual space (e.g., a virtual space associated with direct message communication(s), a virtual space associated with event(s) and/or action(s), etc.) for facilitating communications. As described above, in at least one example, data associated with the second section 204 can be associated with the same or different workspaces. That is, in some examples, the second section 204 can present data associated with the same or different workspaces via an integrated feed. In some examples, the data can be organized and/or is sortable by date, time (e.g., when associated data is posted or an associated operation is otherwise performed), type of action and/or data, workspace, communication channel, user, topic, relevance metric, and/or the like. In some examples, such data can be associated with an indication of which user posted the message and/or performed an action.

For purposes of this discussion, a "message" can refer to any electronically generated digital object provided by a user using the user computing device 104 and that is configured for display within a communication channel and/or other virtual space for facilitating communications (e.g., a virtual space associated with direct message communication(s), etc.) as described herein. A message may include any text, image, video, audio, or combination thereof provided by a user (using a user computing device). For instance, the user may provide a message that includes text, as well as an image and a video, within the message as message contents. In such an example, the text, image, and video would comprise the message. Each message sent or posted to a communication channel of the communication platform can include metadata comprising a sending user identifier, a message identifier, message contents, a group identifier, a communication channel identifier, or the like. In at least one example, each of the foregoing identifiers may comprise American Standard Code for Information Interchange (ASCII) text, a pointer, a memory address, or the like.

In some examples, a user can comment on a message in a "thread." A thread can be a message associated with another message that is not posted to a communication channel, but instead is maintained within an object associated with the original message. Messages and/or threads can be associated with file(s), emoji(s), application(s), etc.

A communication channel or other virtual space can be associated with data and/or content other than messages, or data and/or content that is associated with messages. For example, non-limiting examples of additional data that can be presented via the second section 204 of the user interface 200 include members added to and/or removed from the communication channel, file(s) (e.g., file attachment(s)) uploaded and/or removed from the communication channel, application(s) added to and/or removed from the communication channel, post(s) (data that can be edited collaboratively, in near real-time by one or members of a communication channel) added to and/or removed from the communication channel, description added to, modified, and/or removed from the communication channel, modifications of properties of the communication channel, etc. In some examples, objects, as described above, can be associated with a communication channel or other virtual space (e.g., a direct message, board, etc.). In some examples, individual objects can be referenced in the second section 204. In some examples, individual objects can be associated with an actuation mechanism, such as a link.

In some examples, the second section 204 can be associated with a virtual space that can be associated with a board. In some examples, a board can be accessed from one of the sub-sections 206-210 and/or via another user interface element. A board, which can be an "electronic board," can be a virtual space, canvas, page, or the like for collaborative communication and/or organization within the communication platform. In at least one example, a board can support editable text and/or objects that can be ordered, added, deleted, modified, and/or the like. In some examples, a board can be associated with permissions defining which users of a communication platform can view and/or edit the board. In some examples, a board can be associated with a communication channel and at least some members of the communication channel can view and/or edit the board. In some examples, a board can be sharable such that data associated with the board is accessible to and/or interactable for members of the multiple communication channels, workspaces, organizations, and/or the like.

In at least one example, a board can include section(s) and/or object(s). In some examples, each section can include one or more objects. In some examples, the sections and/or objects can be reordered and/or otherwise rearranged, new sections and/or objects can be added or removed, and/or data associated with such sections and/or objects can be edited and/or modified. That is, boards can be created and/or modified for various uses. That is, users can customize and/or personalize boards to serve individual needs as described herein. As an example, sections and/or objects can be arranged to create a project board that can be used to generate and/or assign tasks, track progress, and/or otherwise manage a project. Further, in some examples, boards can present company metrics and also enable access to company goals so that such information can be stored and/or accessed via a single location. In some examples, boards can be used to keep track of work progress and/or career growth, which can be used by managers or supervisors for managing and/or supervising employees, agents, and/or other workers. In at least one example, a board can be used to track incidents, incoming customer service requests, and/or the like.

In some examples, as illustrated in FIG. 2A, the second section 204 can comprise a feed associated with a single communication channel (e.g., Channel D). In such examples, data associated with the communication channel can be presented via the feed. In at least one example, data associated with a communication channel can be viewable to at least some of the users of a group of users associated with a same group identifier. In some examples, for members of a communication channel, the content of the communication channel (e.g., messaging communications and/or objects) can be displayed to each member of the communication channel. For instance, a common set of group-based messaging communications can be displayed to each member of the communication channel such that the content of the communication channel (e.g., messaging communications and/or objects) may not vary per member of the communication channel. In some examples, messaging communications associated with a communication channel can appear differently for different users (e.g., based on personal configurations, group membership, permissions, policies, etc.).

In at least one example, the format of the individual communication channels or virtual spaces may appear differently to different users. In some examples, the format of the individual communication channels or virtual spaces may appear differently based on which workspace or organization a user is currently interacting with or most recently interacted with. In some examples, the format of the individual communication channels or virtual spaces may appear differently for different users (e.g., based on personal configurations, group membership, permission(s), etc.).

In at least one example, the user interface 200 can include a search mechanism 212, wherein a user can input a search term and the server(s) 102 can perform a search associated with the communication platform. In some examples, the search can be performed across each group with which the user is associated, or the search can be restricted to a particular group, based on a user specification.

In FIG. 2A, the user can interact with the user interface element that corresponds to Channel D in the second sub-section 208 and as such, a feed associated with the communication channel can be presented via the second section 204 of the user interface. In some examples, the second section 204 can be associated with a header that includes user interface elements 214 representing information associated with Channel D. Furthermore, the second section 204 can include user interface elements 216, 218, and 220 which each represent messages posted to the communication channel. As illustrated, the user interface elements 216-220 can include an indication of a user who posted the message, a time when the message was posted, content associated with the message, reactions associated with the message, and/or the like. In at least one example, the second section 204 can include an input mechanism 222, which can be associated with a message composition user interface to enable a user to compose a message to be posted to the communication channel.

Figure 2B:
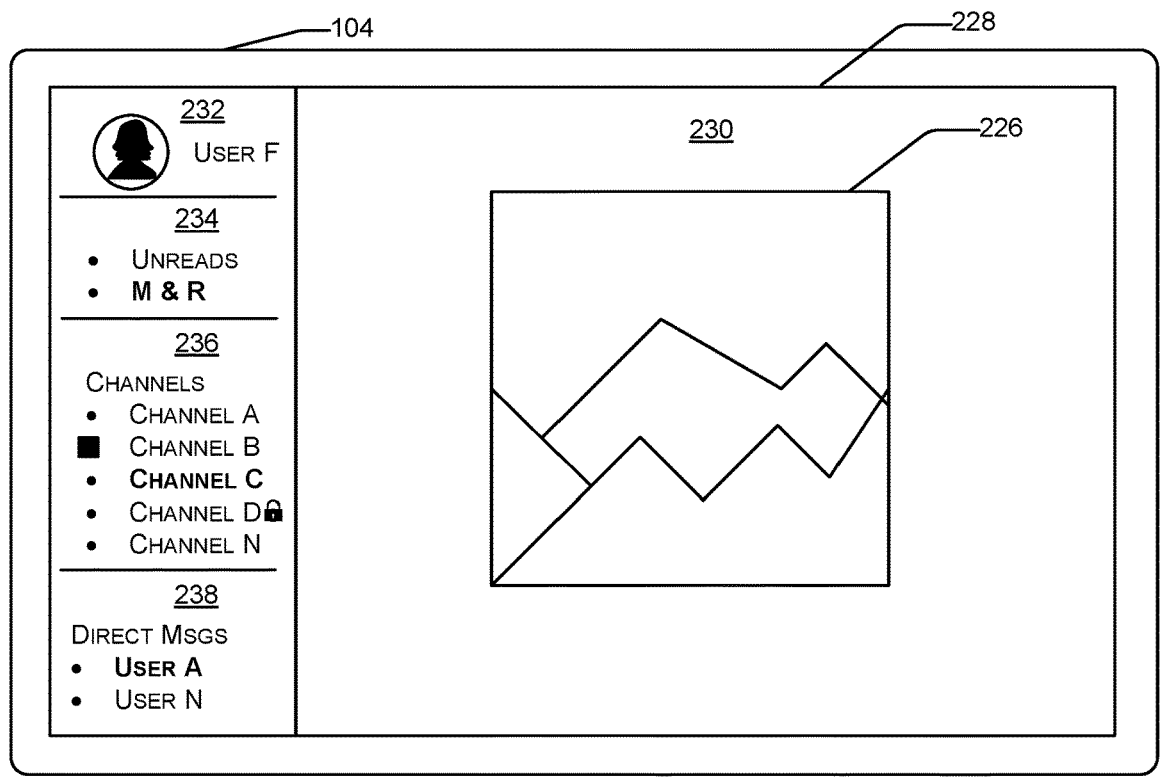
FIG. 2B illustrates an example user interface presented via a second application, as described herein.

As described above, the user interface 200 can be associated with one or more user interface elements, which can be a textual element, graphical element, logo, etc. In some examples, a user interface element can represent, or otherwise be associated with, an object that is associated with the communication platform. In some examples, a user interface element can be associated with an actuation mechanism that, when actuated, can cause a corresponding object to be presented. As a non-limiting example, the user interface element 220 can be associated with a representation of an object 224 (e.g., an image, a file, etc.), which can be associated with a link or other actuation mechanism. In at least one example, based at least in part on detecting an interaction with the representation of the object 224 (e.g., the link or other actuation mechanism associated therewith), the web browser can send an indication of the interaction to the server(s) 102. In some examples, the indication can include a unique identifier associated with the user computing device 104, an object identifier associated with the object, a timestamp associated with the actuation, etc. As described above, the server(s) 102 can determine whether an application associated with the communication platform is associated with the user computing device 104 (e.g., based at least in part on the unique identifier) and, if so, whether the application is associated with an active authentication session (e.g., if the application is authenticated). In at least one example, based at least in part on determining that the application is associated with the user computing device 104 and the application is authenticated, the object management component 116 of the server(s) 102 can send an instruction to the application to cause the application (e.g., a second application that is different than the first application presenting the user interface 200) to present the object 226 via a user interface 228. Such a user interface 228 is illustrated in FIG. 2B. That is, in FIG. 2B, the object 226 can be provided directly via authentication of the second application without the user having to provide authentication data and/or otherwise going through an authentication process to access the object via the web browser.

FIG. 2B illustrates an example of a user interface 228 that can be presented via a second application, such as a dedicated application, on the user computing device 104. In at least one example, the object 226 can be presented via a section 230 of the user interface 228. In some examples, the section 230 can correspond to the second section 204 described above with reference to FIG. 2A. In at least one example, the user interface 228 can include another section 232, which can correspond to the first section 202 described above with reference to FIG. 2A. In at least one example, the section 232 can include one or more sub-sections 234, 236, and 238, which can correspond to the sub-sections 206-210 described above with reference to FIG. 2A. That is, the user interface 228 can be substantially similar to the user interface 200 described above.

In some examples, the user interface 228 can be presented in a window associated with the second application, which can be positioned on top of, proximate to, or otherwise relative to another window associated with the first application presenting the user interface 200 (e.g., as illustrated in FIG. 1). In some examples, as illustrated in FIG. 2B, the user interface 228 can be presented in a full screen view such that the user interface 200 is not visible without closing or minimizing the user interface 228, as illustrated in FIG. 2B.

FIG. 3A illustrates an example user interface presented via a first application, such as a web browser, as described herein. In at least one example, the user interface 300 can include two or more sections, such as a first section 302 and a second section 304. The first section 302 and the second section 304 can correspond to the first section 202 and the second section 204 of the user interface 200, described above with reference to FIG. 2A. In some examples, the first section 302 can have one or more sub-sections 306, 308, and 310, which can correspond to the sub-sections 206-210, described above with reference to FIG. 2A. In some examples, the second section 304 can present data associated with a virtual space, a feed of messages and/or other actions associated with a communication channel or direct message, a board, etc. In at least one example, the user interface 300 can include a search mechanism 312, as described above with reference to FIG. 2A.

Figure 3B:
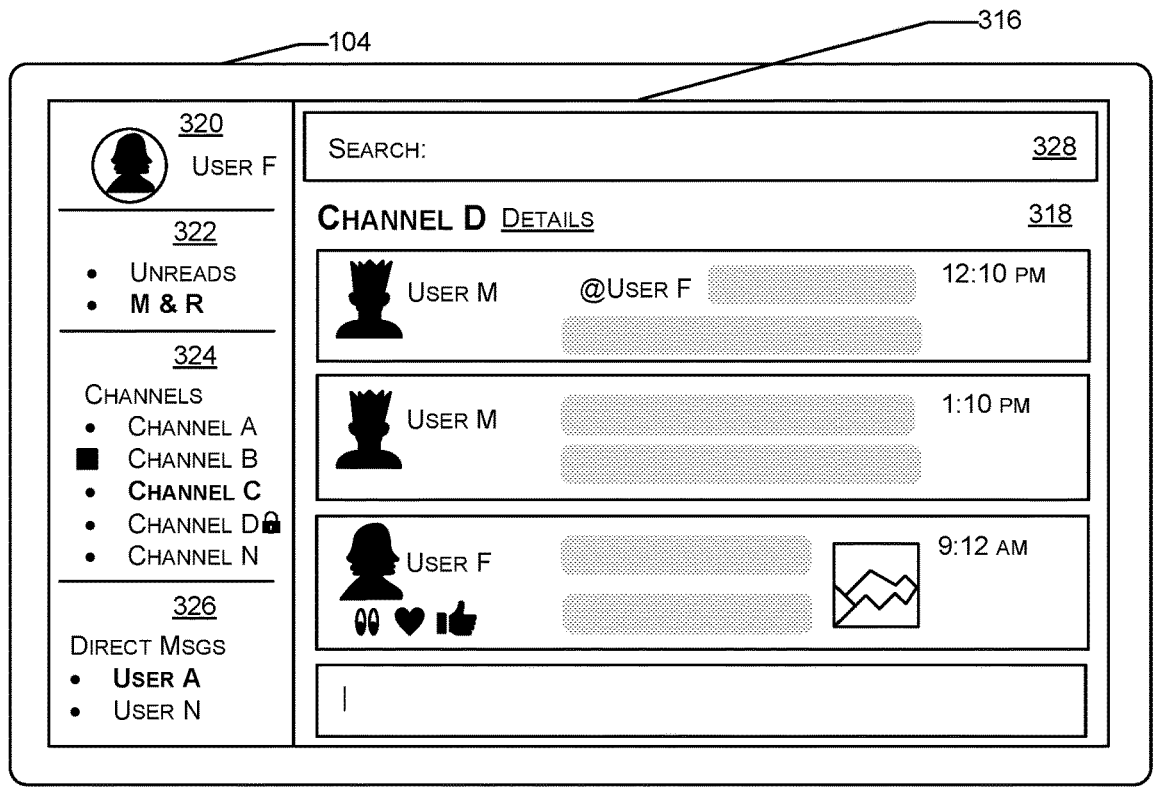
FIG. 3B illustrates an example user interface presented via a second application, as described herein.

In at least one example, the second section 304 can present a channel browsing user interface to enable a user to view communication channel(s). In some example, a user can select a communication channel to join via an interaction with the user interface 300. In at least one example, the second section 304 can be associated with one or more representations of objects 314 (e.g., communication channels), each which can be associated with an actuation mechanism (e.g., a link). In at least one example, based at least in part on detecting an actuation of an actuation mechanism, the first application can send an indication of the actuation to the server(s) 102, as described above. In some examples, the indication can include a unique identifier associated with the user computing device 104, an object identifier associated with the object, a timestamp associated with the actuation, etc. As described above, the server(s) 102 can determine whether an application associated with the communication platform is associated with the user computing device 104 (e.g., based at least in part on the unique identifier) and, if so, whether the application is associated with an active authentication session (e.g., if the application is authenticated). In at least one example, based at least in part on determining that the application is associated with the user computing device 104 and the application is authenticated, the object management component 116 can send an instruction to the application to cause the application (e.g., a second application that is different than the first application presenting the user interface 300) to present the object (e.g., and/or data associated therewith) via a user interface. Such a user interface 316 is illustrated in FIG. 3B. That is, in FIG. 3B, the communication channel (e.g., Channel D) can be provided directly via authentication of the second application without the user having to provide authentication data and/or otherwise going through an authentication process to access the object via the web browser.

FIG. 3B illustrates an example of a user interface 316 that can be presented via a second application, such as a dedicated application, on the user computing device 104. In at least one example, a feed associated with the object (e.g., Channel D) can be presented via a section 318 of the user interface 316. In some examples, the section 318 can correspond to the second section 204 described above with reference to FIG. 2A. In at least one example, the user interface 316 can include another section 320, which can correspond to the first section 202 described above with reference to FIG. 2A. In at least one example, the section 320 can include one or more sub-sections 322, 324, and 326, which can correspond to the sub-sections 206-210 described above with reference to FIG. 2A.

In some examples, the user interface 316 can be presented in a window associated with the second application, which can be positioned on top of, proximate to, or otherwise relative to, another window associated with the first application presenting the user interface 300 (e.g., as illustrated in FIG. 1). In some examples, as illustrated in FIG. 2B, the user interface 316 can be presented in a full screen view such that the user interface 300 is not visible without closing or minimizing the user interface 316, as illustrated in FIG. 3B.

The user interfaces described above with reference to FIGS. 1-3 are provided for illustrative purposes. Techniques described herein can be facilitated via user interfaces that include additional or alternative content that can be arranged in additional or alternative configurations.

Figure 4:
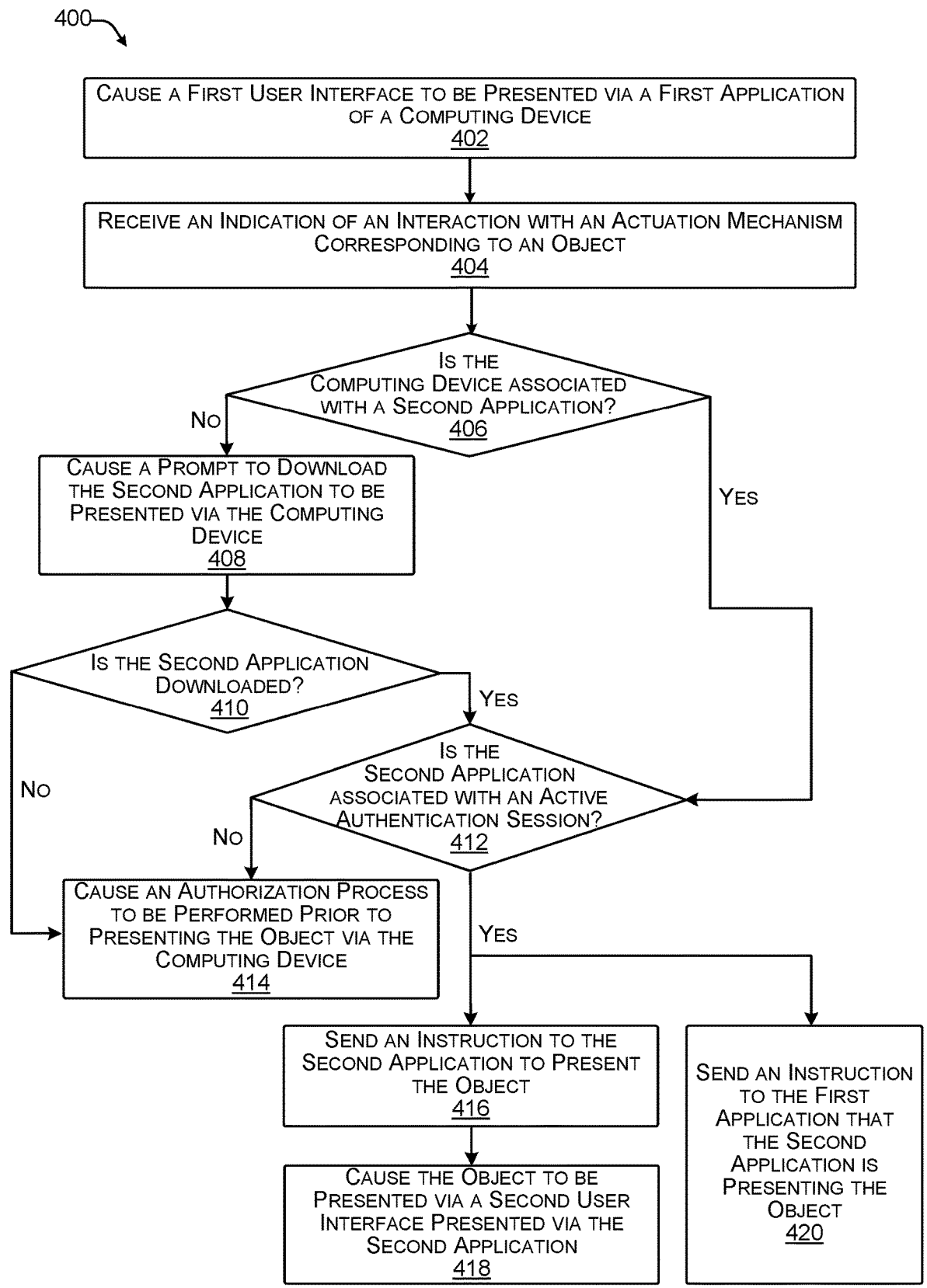
FIG. 4 illustrates an example process for providing direct access to an embedded link via an authenticated application, as described herein.
Figure 5:
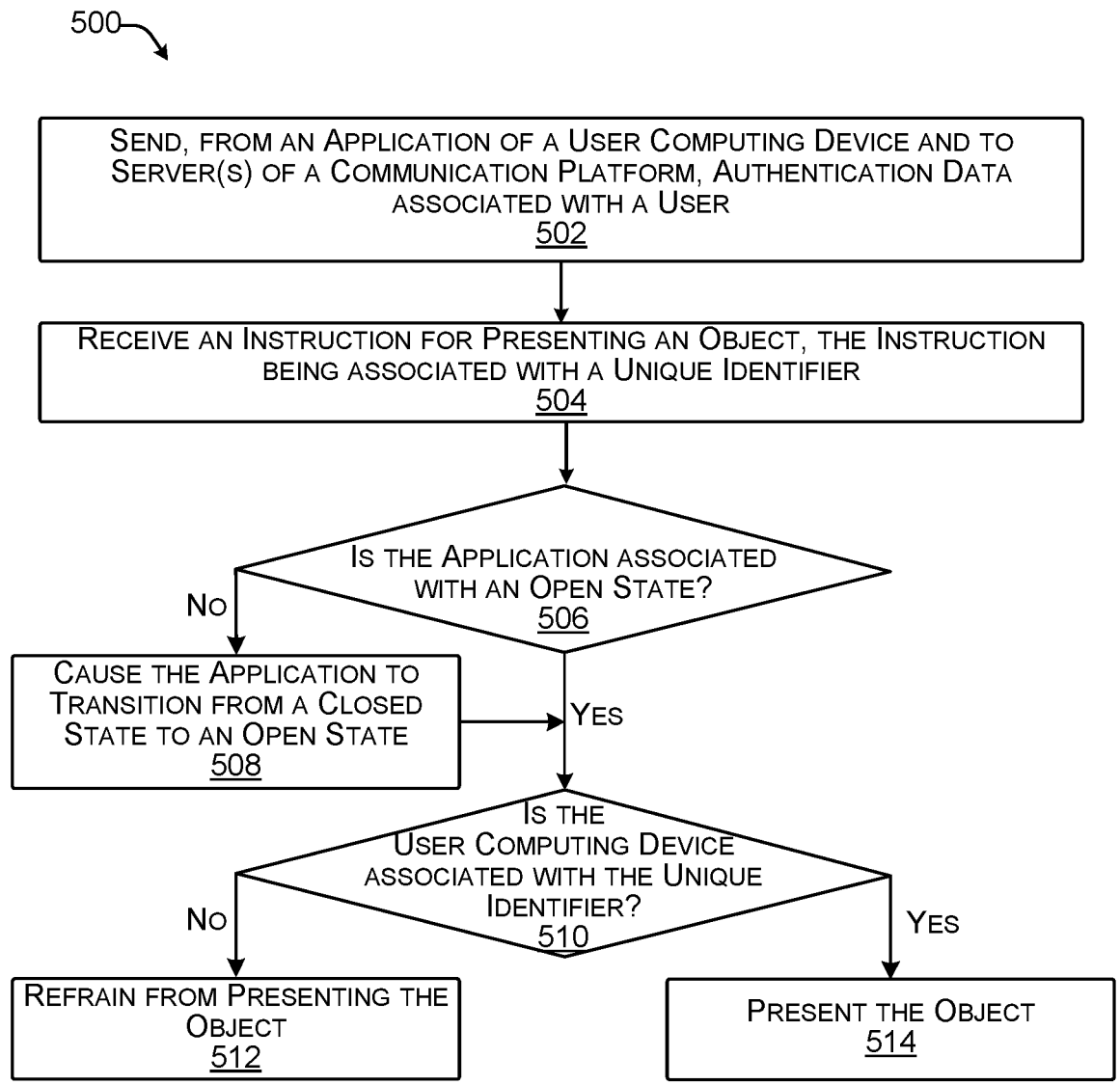
FIG. 5 illustrates an example process for presenting an object via an authenticated application, as described herein.

FIGS. 4 and 5 are flowcharts showing example processes involving techniques as described herein. The processes illustrated in FIGS. 4 and 5 are described with reference to components described above in the environment 100 shown in FIG. 1 for convenience and ease of understanding. However, the processes illustrated in FIGS. 4 and 5 are not limited to being performed using the components described above with reference to the environment 100. Moreover, the components described above with reference to the environment 100 are not limited to performing the processes illustrated in FIGS. 4 and 5.

The processes in FIGS. 4 and 5 are illustrated as collections of blocks in logical flow graphs, which represent sequences of operations that can be implemented in hardware, software, or a combination thereof. In the context of software, the blocks represent computer-executable instructions stored on one or more computer-readable storage media that, when executed by processor(s), perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. In some embodiments, one or more blocks of the process can be omitted entirely. Moreover, the processes in FIGS. 4 and 5 can be combined in whole or in part with each other or with other processes.

FIG. 4 illustrates an example process 400 for proving direct access to an embedded link via an authenticated application, as described herein.

At operation 402, the server(s) 102 can cause a first user interface to be presented via a first application of a computing device (e.g., the user computing device 104). As described above, a user interface associated with the communication platform can be presented via the user computing device 104. In some examples, the user interface can be presented via a first application, such as a web browser. In at least one example, a user can be signed-in to the communication platform via the web browser. That is, in at least one example, the web browser can be authenticated.

In some examples, the user interface presented via the first application can include one or more references to one or more objects that are stored and/or managed by the object management component 116. As described above, an object can be text, an image, a video, a snippet of content, a user profile, a message, a file, a communication channel, a direct message, a board, a virtual space, an invitation, a sign-in request, and/or any other data item. In at least one example, a reference can be associated with an actuation mechanism, such as a link.

At operation 404, the object management component 116 can receive an indication of an interaction with an actuation mechanism corresponding to an object. In at least one example, a user can interact with an actuation mechanism (e.g., the user can actuate the actuation mechanism). The first application can detect the interaction and send an indication of such an interaction (e.g., an actuation) to the server(s) 102. That is, based at least in part on the actuation mechanism being actuated, the object management component 116 can receive an indication of such. In some examples, the indication can include an object identifier associated with the object, a unique identifier associated with the user computing device 104, a timestamp associated with the actuation, and/or the like. In at least one example, the unique identifier can be a device identifier, a desktop identifier, an application identifier, a session identifier, and/or the like. In some examples, the first application (e.g., the web browser) can receive the unique identifier from a second application (e.g., a dedicated application) during a sign-in process. That is, a user can sign-in to the communication platform via the second application, which can use the first application to effectuate the sign-in process. During the sign-in process, the first application can receive the unique identifier and can store the unique identifier for future use. In at least one example, the first application can associate the unique identifier with indications of actuations, as described above.

At operation 406, the object management component 116 can determine whether the user computing device 104 is associated with a second application. In at least one example, the object management component 116 can use the unique identifier to perform a search, look-up, or other operation (e.g., of data in the data store 122) to determine whether the unique identifier, and thus the user computing device 104, is associated with a second application, such as a dedicated application, provided by the communication platform. Based at least in part on determining that the user computing device 104 is not associated with a second application (e.g., an instance thereof), in some examples, the object management component 116 can cause a prompt to download the second application to be presented via the user computing device 104, as illustrated at operation 408. In some examples, such a prompt can be a text message, email, push notification, etc. In some examples, the user can opt to download the second application. In some examples, the user can sign-in to the second application by providing user data. In some examples, such user data can be used to authenticate the user for use of the second application. In some examples, the first application (e.g., the web browser) can facilitate such a process. At operation 410, the object management component 116 can determine whether the second application is downloaded. Based at least in part on determining that the second application is downloaded, the process 400 can proceed at operation 412. Based at least in part on determining that the second application is not downloaded, the process 400 can proceed at operation 414.

At operation 412, the object management component 116 can determine whether the second application is associated with an active authentication session. In at least one example, the object management component 116 can determine whether the second application is associated with an authenticated state and thus, an active authentication session. That is, the object management component 116 can determine whether the second application is associated with valid or active authentication data, provided by the user, that has not timed out or otherwise become invalid or inactive due to an occurrence of an event. In at least one example, the object management component 116 can access the authentication/session data 128 to make such a determination. In at least one example, if the second application is not associated with the user computing device 104 and/or is not associated with an authenticated state, the object management component 116 can cause an authorization process to be performed prior to presenting the object via the user computing device 104, as illustrated at operation 414. In some examples, such an authorization process can require one or more permissions requests to be exchanged between the first application, the second application, and/or the server(s) 102. In some examples, such an authorization process can require one or more requests for permission to be presented via the user computing device 104 to obtain permission from the user. In at least one example, upon successful completion of the authorization process, the object management component 116 can cause the object to be presented.

At operation 416, the object management component 116 can send an instruction to the second application to present the object. As described above, based at least in part on the object management component 116 determining that there is an instance of the second application on the user computing device 104 that is associated with the communication platform (e.g., a dedicated application) and that such an instance is associated with an active authentication session, the object management component 116 can send an instruction to the user computing device 104 (e.g., to the instance of the second application) to present the object via a user interface associated therewith. In some examples, the instruction can include the unique identifier (e.g., as received with the indication at operation 404), an object identifier, and/or the like.

In some examples, the instruction can be associated with a real-time message. In some examples, the instruction can be associated with a push notification or other notification that can be received by the user computing device 104. In some examples, the instruction can be sent in response to a query (e.g., a "pull") from the second application to determine whether the first application or another web page is trying to load the second application.

In some examples, the instruction can cause the second application to transition from a closed state to an open state. That is, if the second application is associated with a close state, in some examples, the instruction can cause the second application to transition to an open state to present the object.

In some examples, the instruction can cause the second application to transition from a first workspace to a second workspace. That is, in some examples, the second application can be authenticated for a first workspace and a second workspace. That is, the second application can be associated with a first group identifier and a second group identifier, both of which are authenticated. In at least one example, the second application can be associated with an active session using the first group identifier and the object can be associated with the second group identifier (or vice versa). Based at least in part on the second application being authenticated with the first group identifier and the second group identifier, the object management component 116 can send the instruction to the second application and the second application can transition to an active session using the second group identifier. That is, the authentication of the second application (regardless of which group identifier is active) can be used to cause the object to be presented via the second application.

As described above, in some examples, a user can be signed-in to multiple instances of the second application (e.g., on multiple user computing devices). Each user computing device can be associated with a unique identifier. In some examples, the object management component 116 can send instructions to each of the instances of the second application. The instructions can be associated with the unique identifier (e.g., associated with the user computing device 104, as received with the indication at operation 404). In such examples, each instance of the second application can compare respective unique identifiers with the unique identifier associated with a received instruction. If unique identifiers match, or otherwise correspond, the associated user computing device and instance of the second application can present the object. In the context of the process 400, the instruction at operation 416 can be one of a plurality of instructions sent to one of a plurality of user computing devices. In at least one example, the user computing device 104 can be associated with a unique identifier that matches, or otherwise corresponds, with the unique identifier received in the instruction (and provided by the first application at operation 404).

At operation 418, the object management component 116 can cause the object to be presented via a second user interface presented via the second application. Based at least in part on receiving the instruction, and in some examples, determining that a unique identifier associated with the instruction and the unique identifier associated with the user computing device 104 match, or otherwise correspond, the second application can present the object via a user interface associated therewith. That is, the object management component 116 can cause the object to be presented via the second application.

At operation 420, the object management component 116 can send an instruction to the first application that the second application is presenting the object. In at least one example, based at least in part on determining that (i) the user computing device 104 is associated with a second application associated with the communication platform and (ii) the second application is authenticated, the object management component 116 can send an indication that the second application is presenting or is to present the object to the first application. That is, the object management component 116 can notify the first application that the presentation of the object is being handled (e.g., by the second application). In some examples, such an indication can be sent to the first application responsive to receiving an indication from a particular user computing device and/or instance of the second application (e.g., the user computing device 104 and/or the instance of the second application associated therewith) that it is presenting or is to present the object. In some examples, based at least in part on receiving such an indication from the object management component 116, the first application can close a web page that was previously presenting the user interface and/or the like.

FIG. 5 illustrates an example process 500 for presenting an object via an authenticated application, as described herein.

At operation 502, an application, such as a dedicated application associated with a communication platform, of a user computing device 104 can send authentication data associated with a user to server(s) 102 of the communication platform. In at least one example, a user can submit user data and/or authentication data to authenticate the application for use on the user computing device 104. In some examples, the user data and/or authentication data can be provided to the server(s) 102 via another application (e.g., a web browser) on the user computing device 104. In at least one example, the user data and/or authentication data can be stored by the server(s) 102 for a period of time, until an event occurs, etc. Such user data and/or authentication data can be used to authenticate the application for use on the user computing device 104. An application authenticated for use on the user computing device 104 can be associated with an authenticated state and an active authentication session.

At operation 504, the user computing device 104 can receive an instruction for presenting an object, the instruction being associated with a unique identifier. As described above, the object management component 116 associated with the server(s) 102 can receive an indication of an actuation of an actuation mechanism associated with an object maintained by the server(s) 102. In at least one example, such an indication can be a request to access the object. Such an indication can be associated with a unique identifier associated with the user computing device 104, an object identifier associated with the object, a timestamp associated with the actuation, etc. In at least one example, based at least in part on receiving the indication, the object management component 116 can determine, whether there is an application on the user computing device 104 that is associated with the communication platform (e.g., a dedicated application). Further, the object management component 116 can determine whether such an application is associated with an active authentication session. In at least one example, if the user computing device 104 is associated with an authenticated application, the object management component 116 can send an instruction to the user computing device 104 to present the object via a user interface associated therewith. As described above, in some examples, the instruction can be associated with the unique identifier associated with the user computing device 104, an object identifier associated with the object, and/or the like. In some examples, the instruction can be associated with a real-time message. In some examples, the instruction can be associated with a push notification or other notification that can be received by the user computing device 104. In some examples, the instruction can be sent in response to a query (e.g., a "pull") from the application to determine whether a web page is trying to load the application.

As described above, in some examples, a user can be signed-in to multiple instances of the application (e.g., on multiple user computing devices). Each instance of the application and/or associated user computing device can be associated with a unique identifier. In some examples, the object management component 116 can send instructions to each of the instances of the application. That is, the application referred to here, in process 500, can be an instance of the application into which the user is signed in.

At operation 506, the user computing device 104 can determine whether the application is associated with an open state. In at least one example, if the application is not associated with an open state (e.g., is associated with a closed state), the application can transition from a closed state to an open state. That is, the user computing device 104 can cause the application to transition from a closed state to an open state, as illustrated at operation 508.

At operation 510, the application can determine whether the user computing device 104 is associated with the unique identifier. In at least one example, the application can compare a unique identifier associated with the user computing device 104 with the unique identifier associated with the instruction (e.g., received at operation 504). Based at least in part on determining that the unique identifiers do not match, or otherwise correspond, (e.g., the user computing device 104 is not associated with the unique identifier), the application can refrain from presenting the object, as illustrated at operation 512. That is, if the application is not authenticated and/or associated with the same user computing device 104 from which a request to access the object was received, the application can refrain from presenting the object. Based at least in part on determining that the unique identifiers match, or otherwise correspond, (e.g., the user computing device 104 is associated with the unique identifier), the application can present the object, as illustrated at operation 514. That is, based at least in part on determining that the application is associated with a same user computing device 104 from which a request to access the object was received and/or that the application is authenticated, the object can be presented via the application. The application can load the object into a user interface presented thereby. In some examples, based at least in part on determining that the unique identifiers match, or otherwise correspond, (e.g., the user computing device 104 is associated with the unique identifier) and presenting the object, the application can send an indication of such to the server(s) 102.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

Example Clauses

A. A method comprising: causing, by a server computing device associated with a group-based communication platform, a first user interface to be presented via a web browser of a client computing device, wherein the first user interface is associated with the group-based communication platform and includes an actuation mechanism corresponding to an object associated with the group-based communication platform; receiving, by the server computing device, an indication of an interaction with the actuation mechanism; and based at least in part on (i) receiving the indication of the interaction with the actuation mechanism and (ii) a determination that an instance of an application associated with the group-based communication platform, on the client computing device, is associated with an active authentication session, causing the object to be presented via a second user interface presented via the instance of the application.

B. The method of paragraph A, wherein the indication of the interaction with the actuation mechanism is associated with a unique identifier of the client computing device, and wherein the determination that the instance of the application is associated with the active authentication session is based at least in part on a determination that (i) the unique identifier is associated with the instance of the application and (ii) the instance of the application is associated with an authenticated state.

C. The method of paragraph A or B, further comprising, based at least in part on receiving the indication and the determination that the instance of the application is associated with the active authentication session, sending an instruction to at least the instance of the application to present the object.

D. The method of paragraph C, wherein the instruction is sent as a real-time message, within a threshold amount of time of when the indication is received.

E. The method of paragraph C or D, wherein the application is associated with a closed state, and wherein the instruction causes the instance of the application to transition to an open state prior to presenting the object.

F. The method of any of paragraphs C-E, further comprising: receiving, by the server computing device and from the instance of the application associated with the client computing device, a response to the instruction indicating that the object is being presented via the instance of the application; and based at least in part on receiving the response, causing a web page presenting the first user interface to be closed.

G. The method of any of paragraphs A-F, wherein the actuation mechanism comprises a hyperlink.

H. The method of any of paragraphs A-G, wherein the object comprises a message, a file, a communication channel, a board, or a direct message.

I. The method of any of paragraphs A-H, wherein at least one of the first user interface or the object is associated with a first group identifier, and wherein the determination that the instance of the application is associated with the active authentication session is based at least in part on the instance of the application being authenticated in association with a second group identifier.

J. The method of paragraph I, wherein the active authentication session is associated with the first group identifier and the second group identifier.

K. A system comprising: one or more processors; and one or more non-transitory computer-readable media storing instructions that, when executed by the one or more processors, cause the system to perform operations comprising: causing a first user interface to be presented via a web browser of a client computing device, wherein the first user interface is associated with a group-based communication platform and includes an actuation mechanism corresponding to an object associated with the group-based communication platform; receiving an indication of an interaction with the actuation mechanism; and based at least in part on (i) receiving the indication of the interaction with the actuation mechanism and (ii) a determination that an instance of an application associated with the group-based communication platform, on the client computing device, is associated with an active authentication session, causing the object to be presented via a second user interface presented via the instance of the application.

L. The system of paragraph K, wherein the indication of the interaction with the actuation mechanism is associated with a unique identifier associated with the client computing device, and wherein the determination that the instance of the application is associated with the active authentication session is based at least in part on a determination that (i) the unique identifier is associated with the instance of the application and (ii) the instance of the application is associated with an authenticated state.

M. The system of paragraph K or L, further comprising, based at least in part on receiving the indication and the determination that the instance of the application is associated with the active authentication session, sending an instruction to at least the instance of the application to present the object.

N. The system of paragraph M, wherein the instruction is sent as a real-time message, within a threshold amount of time of when the indication is received.

O. The system of paragraph M or N, wherein the instance of the application is associated with a closed state, and wherein the instruction causes the instance of the application to transition to an open state prior to presenting the object.

P. The system of any of paragraphs K-O, wherein at least one of the first user interface or the object is associated with a first group identifier, and wherein the determination that the instance of the application is associated with the active authentication session is based at least in part on the application being authenticated in association with at least one of the first group identifier or a second group identifier.

Q. One or more non-transitory computer-readable media storing instructions that, when executed by one or more processors, cause the one or more processors to perform operations comprising: causing a first user interface to be presented via a first application of a computing device, wherein the first user interface includes an actuation mechanism corresponding to an object associated with a platform, and wherein the computing device is associated with a second application associated with the platform; receiving an indication of an interaction with the actuation mechanism; and based at least in part on (i) receiving the indication of the interaction with the actuation mechanism and (ii) a determination that the second application is associated with an active authentication session, causing the object to be presented via a second user interface presented via the second application.

R. The one or more non-transitory computer-readable media of paragraph Q, wherein the indication of the interaction with the actuation mechanism is associated with a unique identifier associated with the computing device, and wherein the determination that the second application is associated with the active authentication session is based at least in part on a determination that (i) the unique identifier is associated with the second application and (ii) the second application is associated with an authenticated state.

S. The one or more non-transitory computer-readable media of paragraph Q or R, further comprising, based at least in part on receiving the indication and the determination that the second application is associated with the active authentication session, sending, as a real-time message or a push notification, an instruction, to the second application, to present the object.

T. The one or more non-transitory computer-readable media of any of paragraphs Q-S, wherein at least one of the first user interface or the object is associated with a first group identifier, and wherein the determination that the second application is associated with the active authentication session is based at least in part on the second application being authenticated in association with the first group identifier or a second group identifier.

While the example clauses described above are described with respect to one particular implementation, it should be understood that, in the context of this document, the content of the example clauses can also be implemented via a method, device, system, a computer-readable medium, and/or another implementation. Additionally, any of examples A-T may be implemented alone or in combination with any other one or more of the examples A-T.

What is claimed is:
1. A method comprising:
causing, by a server computing device associated with a group-based communication platform, a first user interface to be presented via an application on a web browser of a client computing device, wherein the first user interface is associated with the group-based communication platform and includes an actuation mechanism corresponding to an object associated with the group-based communication platform;
receiving, by the server computing device, an indication of an interaction with the actuation mechanism, wherein the indication of the interaction with the actua- tion mechanism is associated with a unique identifier of the client computing device;
determining, based at least in part on the indication of the interaction, that an instance of a dedicated application associated with the group-based communication platform, on the client computing device, is associated with an active authentication session based at least in part on a determination that (i) the unique identifier is associated with the instance of the dedicated application and (ii) the instance of the dedicated application is associated with an authenticated state, wherein the dedicated application is associated with a closed state;
sending a first instruction to the dedicated application to transition to an open state prior to presenting the object;
causing, based at least in part on the indication of the interaction and the instance of the dedicated application being associated with the active authentication session, the object to be presented via a second user interface presented via the instance of the dedicated application, wherein the second user interface is different than the first user interface; and
sending a second instruction to the application on the web browser that the dedicated application is presenting the object.

2. The method of claim 1, wherein the second instruction is sent as a real-time message, within a threshold amount of time of when the indication is received.

3. The method of claim 1, further comprising:
receiving, by the server computing device and from the instance of the dedicated application associated with the client computing device, a response to the second instruction indicating that the object is being presented via the instance of the dedicated application; and
based at least in part on receiving the response, causing a web page presenting the first user interface to be closed.

4. The method of claim 1, wherein the actuation mechanism comprises a hyperlink.

5. The method of claim 1, wherein the object comprises a message, a file, a communication channel, a board, or a direct message.

6. The method of claim 1, wherein at least one of the first user interface or the object is associated with a first group identifier, and wherein the determining that the instance of the dedicated application is associated with the active authentication session is based at least in part on the instance of the dedicated application being authenticated in association with a second group identifier.

7. The method of claim 6, wherein the active authentication session is associated with the first group identifier and the second group identifier.

8. The method of claim 1, further comprising:
determining that the dedicated application is not associated with the client computing device; and
causing a prompt to download the dedicated application to be presented via the client computing device.

9. The method of claim 1, wherein the object is one of a text, an image, a video, a snippet of content, a user profile, a message, a file, a communication channel, a direct message, a board, a virtual space, an invitation, or a sign-in request.

10. The method of claim 1, wherein causing the object to be presented via the second user interface occurs without receiving authentication data from a user associated with the client computing device.

11. The method of claim 1, wherein the first instruction further causes the dedicated application to transition from a first workspace to a second workspace.

12. The method of claim 1, wherein the first instruction is associated with the unique identifier associated with the client computing device.

13. The method of claim 1, wherein the active authentication session is associated with authentication data, the authentication data configured to be stored by the server computing device for a period of time.

14. The method of claim 1, wherein the first instruction is sent in response to a query from the application to determine whether the web browser is trying to load the application.

15. The method of claim 1, wherein the unique identifier is one of a device identifier, a desktop identifier, an application identifier, or a session identifier.

16. A system comprising:
one or more processors; and
one or more non-transitory computer-readable media storing instructions that, when executed by the one or more processors, cause the system to perform operations comprising:
causing a first user interface to be presented via an application on a web browser of a client computing device, wherein the first user interface is associated with a group-based communication platform and includes an actuation mechanism corresponding to an object associated with the group-based communication platform;
receiving an indication of an interaction with the actuation mechanism, wherein the indication of the interaction with the actuation mechanism is associated with a unique identifier of the client computing device;
determining, based at least in part on the indication of the interaction, that an instance of a dedicated application associated with the group-based communication platform, on the client computing device, is associated with an active authentication session based at least in part on a determination that (i) the unique identifier is associated with the instance of the dedicated application and (ii) the instance of the dedicated application is associated with an authenticated state, wherein the dedicated application is associated with a closed state;
sending a first instruction to the dedicated application to transition to an open state prior to presenting the object;
causing, based at least in part on the indication of the interaction and the instance of the dedicated application being associated with the active authentication session, the object to be presented via a second user interface presented via the instance of the dedicated application, wherein the second user interface is different than the first user interface; and
sending a second instruction to the application on the web browser that the dedicated application is presenting the object.

17. The system of claim 16, wherein the second instruction is sent as a real-time message, within a threshold amount of time of when the indication is received.

18. The system of claim 16, wherein at least one of the first user interface or the object is associated with a first group identifier, and wherein the determining that the instance of the dedicated application is associated with the active authentication session is based at least in part on the dedicated application being authenticated in association with at least one of the first group identifier or a second group identifier.

19. One or more non-transitory computer-readable media storing instructions that, when executed by one or more processors, cause the one or more processors to perform operations comprising:

causing a first user interface to be presented via an application on a web browser of a computing device, wherein the first user interface includes an actuation mechanism corresponding to an object associated with a platform, and wherein the computing device is associated with a dedicated application associated with the platform;

receiving an indication of an interaction with the actuation mechanism, wherein the indication of the interaction with the actuation mechanism is associated with a unique identifier associated with the computing device;

determining, based at least in part on the indication of the interaction, that the dedicated application is associated with an active authentication session based at least in part on a determination that (i) the unique identifier is associated with an instance of the dedicated application and (ii) the instance of the dedicated application is associated with an authenticated state, wherein the dedicated application is associated with a closed state;

sending a first instruction to the dedicated application to transition to an open state prior to presenting the object;

causing, based at least in part on the indication of the interaction and the dedicated application being associated with the active authentication session, the object to be presented via a second user interface presented via the dedicated application, wherein the second user interface is different than the first user interface; and sending a second instruction to the application on the web browser that the dedicated application is presenting the object.

20. The one or more non-transitory computer-readable media of claim 19, wherein at least one of the first user interface or the object is associated with a first group identifier, and wherein the determining that the dedicated application is associated with the active authentication session is based at least in part on the dedicated application being authenticated in association with the first group identifier or a second group identifier.

\* \* \* \* \*